Aug. 17, 1937.          J. EGGERT ET AL          2,090,441
DEVICE FOR ILLUMINATING LENTICULAR FILM
Filed Nov. 16, 1934
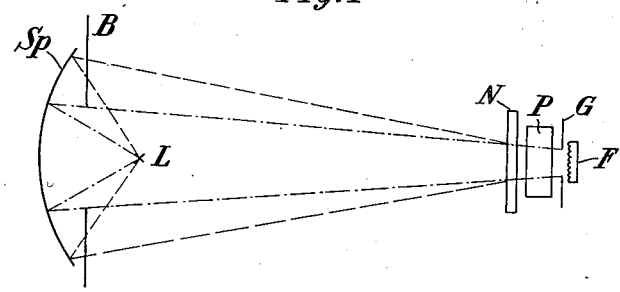
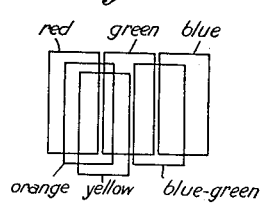
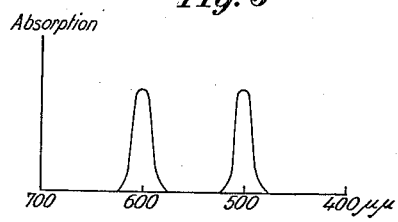
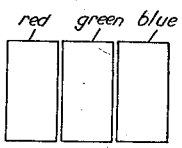
Inventors:
John Eggert,
Gerd Heymer,
By Potter, Pierce & Scheffler,
Attorneys.

Patented Aug. 17, 1937

2,090,441

UNITED STATES PATENT OFFICE 2,090,441

DEVICE FOR ILLUMINATING LENTICULAR FILM

John Eggert, Leipzig-Gohlis, and Gerd Heymer, Wolfen Kreis Bitterfeld, Germany, assignors to I. G. Farbenindustrie Aktiengesellschaft, Frankfort-on-the-Main, Germany Application November 16, 1934, Serial No. 753,398
In Germany November 18, 1933

4 Claims. (Cl. 88—16.4)

Our present invention relates to a device for illuminating lenticular film.

One of its objects is a device for illuminating lenticular film. Another object is an arrangement for projecting lenticular film. Further objects will be seen from the detailed specification following hereafter. Reference is made to the accompanying drawing in which Fig. 1 shows diagrammatically an arrangement for illuminating lenticular film, Fig. 2 shows diagrammatically the superimposed images of a slit causing a whitening of the colors, Fig. 3 shows the spectral absorption of a filter according to this invention, and Fig. 4 shows diagrammatically a spectrum in which whitening of the colors is avoided by the insertion of a filter according to this invention.

It is known practice to illuminate lenticular films by using instead of the multi-colored filter, prisms or gratings which spectrally decompose the projection light. The purity of the colors of a spectrum depends on the width of the slit whose image is decomposed by the prism or grating; the more the slit-images of the different colors blend with one another the more impure do the colors become, that is to say they whiten. This occurs to an appreciable extent if the slit has an aperture greater than F:15 (the aperture of the slit is the angle which is formed by the lines running from the borders of the slit to the center of the film) according to the terminology usual in optics. In the projection of lenticular films by means of prisms or gratings, the mirror or the condenser of the arc lamp which is arranged at a distance from the film which corresponds to that at which was arranged the optically effective aperture of the filter in exposure or printing generally represents the slit. In order that this "slit" may be made narrow the extension of the mirror in the direction at right angles to that of the lenticular embossing would have to be as small as possible; this would, however, lead to a considerable reduction in the brightness of the illumination.

This invention relates to means for avoiding this loss of brightness by the insertion of filters which absorb the spectral region between the primary colors of the spectrum, the filters being inserted in the path of the rays from the source of light to the prism or grating. By means of this filter the colors are prevented from overlapping in these regions and three regions of considerably purer color are produced corresponding with the three color zones of the normal filter used in lenticular projection.

Glass colored with rare earths or their compounds, for instance, so called didym glasses, are suitable filters. This glass has the property of absorbing at the position where the three basic sensation curves of the eye intersect. These regions of absorption, however, agree fundamentally with the spectral regions to be separated by the present method. Instead of didym glass there may also be used Neophane Glass (registered trade-mark) that is a glass which has been made with the addition of neodym, there may be used any other layers containing suitable absorptive substances that is to say substances which have narrow absorption bands with the middle lying at a wave length of 500 and 600 $\mu\mu$ respectively. The bands reach, for instance, from 520 to 480 $\mu\mu$.

The invention will now be described with reference to the accompanying drawing. In Fig. 1 there is shown an arrangement for printing according to this invention. L is the source of light, for instance, the crater of an arc lamp, and Sp is a mirror which is arranged at a distance from the lenticular film F corresponding with that at which was arranged the optically effective aperture of light from the film in printing if a print is made of the original or with that at which the multi-color filter was arranged from the film during exposure if the original is to be reproduced directly, and projecting an image of the source of light on the film F. G is the film gate provided with the usual gate aperture. Near the film gate G between the film gate and the source of light there is arranged the direct vision prism P or a grating decomposing the light emanating from the source of light into the spectral colors.

When viewing the mirror without the insertion of the prism the mirror is seen as a bright luminous plane, because as apparent from Fig. 1 light is projected on the film gate G from all parts of the mirror. If a direct vision prism is inserted in the trace of the rays and the mirror is viewed through this prism the same phenomenon occurs which is produced when viewing a slit through a direct vision prism, that is to say the slit is seen extended to a spectrum. The spectrum thus produced is a virtual spectrum because it cannot be reproduced on a screen. In the same manner as the slit the mirror inserted instead of the slit is seen extended to a spectrum. If a lenticular film is arranged at the place of the eye, the small lenticular elements of the film project an image of the virtual spectrum on the emulsion layer of the film which is on the side remote from the source of light. If the areas of the spectral colors and their succession correspond with those of the multi-color filter during exposure and if the distance from the film is the same as the distance of the multi-color filter from the film during exposure, the colors are reproduced in the correct manner.

Inasmuch as the mirror is a slit of considerable breadth the above explained drawback connected with the use of a broad slit occurs. The originally bright colors of the spectrum whiten with increasing breadth of the slit. The cause resides in the fact that each of the images of the slit, which compose the spectrum is displaced with relation to the adjacent according to the wave length. These relations are diagrammatically shown in Fig. 2. If the single image of the slit is very broad, a strong superimposition of the single images of the slit takes place. At any place of the spectrum there will not be found a certain spectral color but a mixture of colors which is the whiter the more wave lengths participate in the mixture. In order to improve the separation of the colors one could place a mask B before the mirror as shown in Fig. 1, whereby the breadth of the slit is diminished. However, this involves a considerable loss of light.

According to this invention there is inserted a uniformly colored filter N as above described, for instance, made of a glass colored with didym in front of the direct vision prism P. This filter has the spectral absorption shown in Fig. 3. The color of the filter is a so-called unpure gray according to Ostwald. By means of this filter there are absorbed narrow spectral regions between the three fundamental colors red, green and blue, that is to say, in the regions of about 500 μμ and 600 μμ so that, for instance, the yellow and the blue-green images of the slit as shown in Fig. 2 are suppressed and a spectrum as diagrammatically shown in Fig. 4 is obtained. Thus the purity of the spectrum is considerably increased whereas the loss of light is relatively small in view of the narrow bands which have been filtered by absorption. Therefore, the original increase of light with exception of the little loss caused by the absorption bands by using the spectral process is not lost because the separation of the light into the fundamental colors is not produced by filters which absorb two thirds of the spectrum, but in spectral manner, that is to say, nearly without losses owing to absorption.

What we claim is:

1. A device for illuminating lenticular film which comprises in combination a film gate provided with an aperture, a lenticular film having a record of a multi-color filter in said gate, a source of light arranged on the side of the lenticular elements of said film at a distance from the film corresponding to that of the optically effective aperture of the multi-color filter during exposure, an optical means for decomposing the light of said source of light into a spectrum arranged near said film gate having a dispersion to provide a spectrum that the film lenticulations will image in register with the multi-color filter record of the film, and a filter which absorbs yellow and blue green between the fundamental colors and transmits the red, green and blue of the spectrum inserted in the path of the light rays between said means for decomposing the light rays into a spectrum and said source of light.

2. A device for illuminating lenticular film which comprises in combination a film gate provided with an aperture, a lenticular film having a record of a multi-color filter in said gate, a source of light arranged on the side of the lenticular elements of said film at a distance from the film corresponding to that of the optically effective aperture of the multi-color filter during exposure, an optical means for decomposing the light of said source of light into a spectrum arranged near said film gate having a dispersion to provide a spectrum that the film lenticulations will image in register with the multi-color filter record of the film and a filter of glass colored with a compound selected from the group consisting of rare earths and their compounds and absorbing yellow and blue green between the fundamental colors of the spectrum inserted in the path of the light rays between said means for decomposing the light rays into a spectrum and said source of light.

3. A device for illuminating lenticular film which comprises in combination a film gate provided with an aperture, a lenticular film having a record of a multi-color filter in said gate, a source of light arranged on the side of the lenticular elements of said film at a distance from the film corresponding to that of the optically effective aperture of the multi-color filter during exposure, an optical means for decomposing the light of said source of light into a spectrum arranged near said film gate having a dispersion to provide a spectrum that the film lenticulations will image in register with the multi-color filter record of the film, and a didym glass filter absorbing narrow bands between the fundamental colors of the spectrum inserted in the path of the light rays between said means for decomposing the light rays into a spectrum and said source of light.

4. A device for illuminating lenticular film which comprises in combination a film gate provided with an aperture, a lenticular film having a record of a multi-color filter in said gate, a source of light arranged on the side of the lenticular elements of said film at a distance from the film corresponding to that of the optically effective aperture of the multi-color filter during exposure, an optical means for decomposing the light of said source of light into a spectrum arranged near said film gate having a dispersion to provide a spectrum that the film lenticulations will image in register with the multi-color filter record of the film, and a neodym glass filter absorbing narrow bands between the fundamental colors of the spectrum inserted in the path of the light rays between said means for decomposing the light rays into a spectrum and said source of light.

JOHN EGGERT.
GERD HEYMER.